Figure 3:
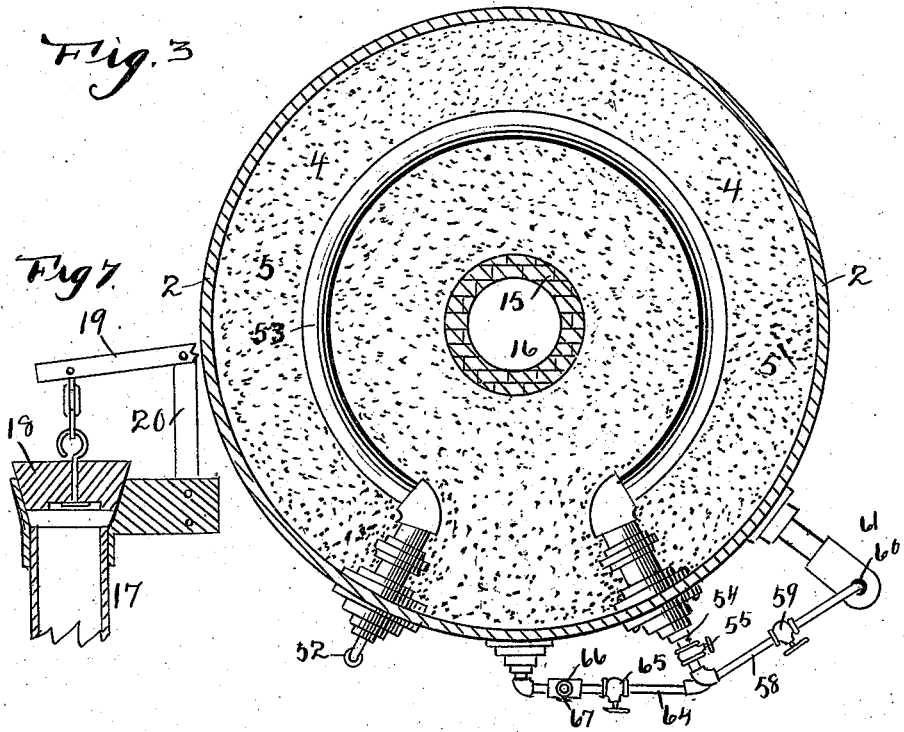

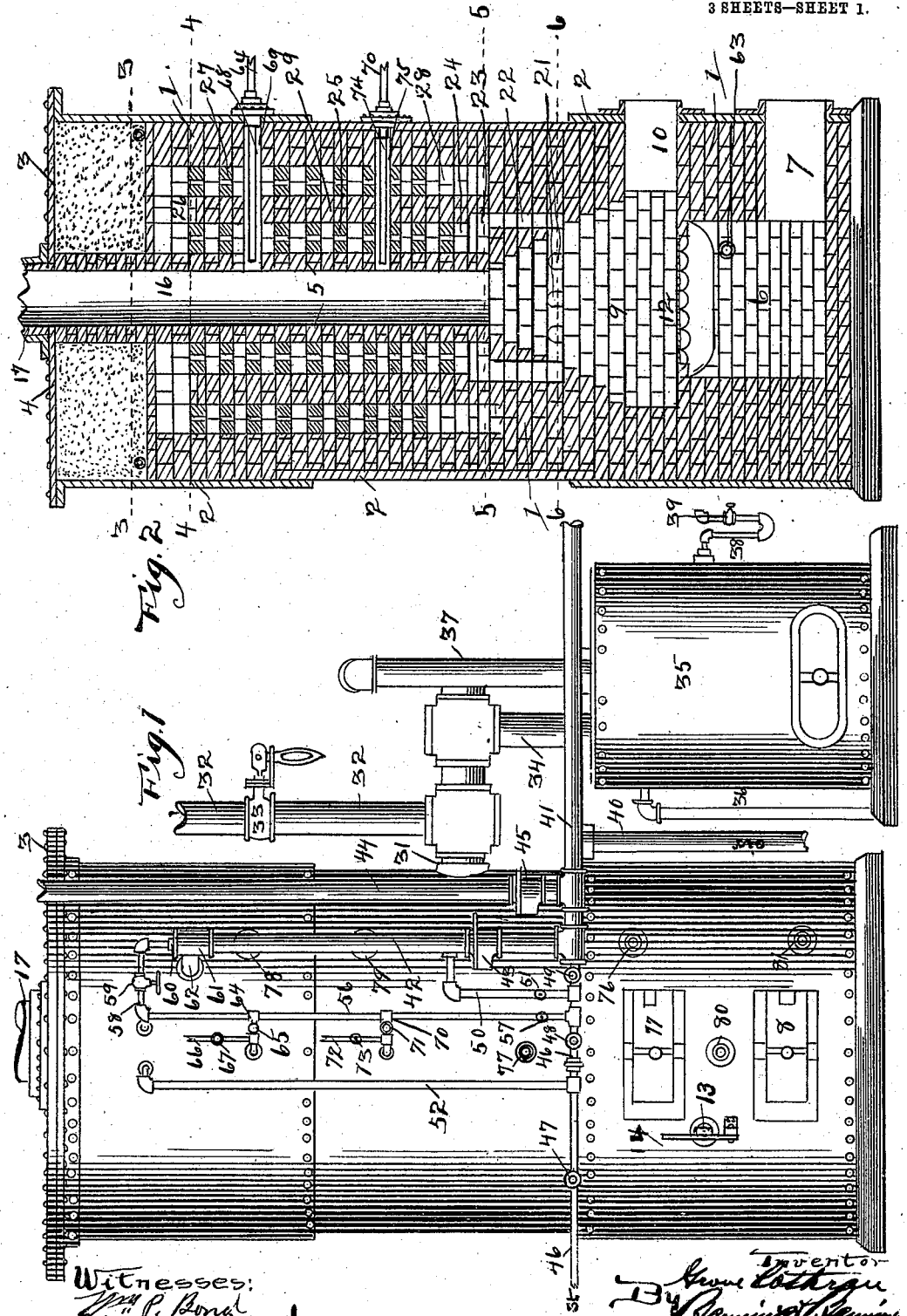

No. 847,733. PATENTED MAR. 19, 1907.
G. COTHRAN.
PROCESS OF GENERATING GAS.
APPLICATION FILED JULY 6, 1905.

3 SHEETS—SHEET 2.

No. 847,733. PATENTED MAR. 19, 1907.
G. COTHRAN.
PROCESS OF GENERATING GAS.
APPLICATION FILED JULY 6, 1905.
3 SHEETS—SHEET 3.
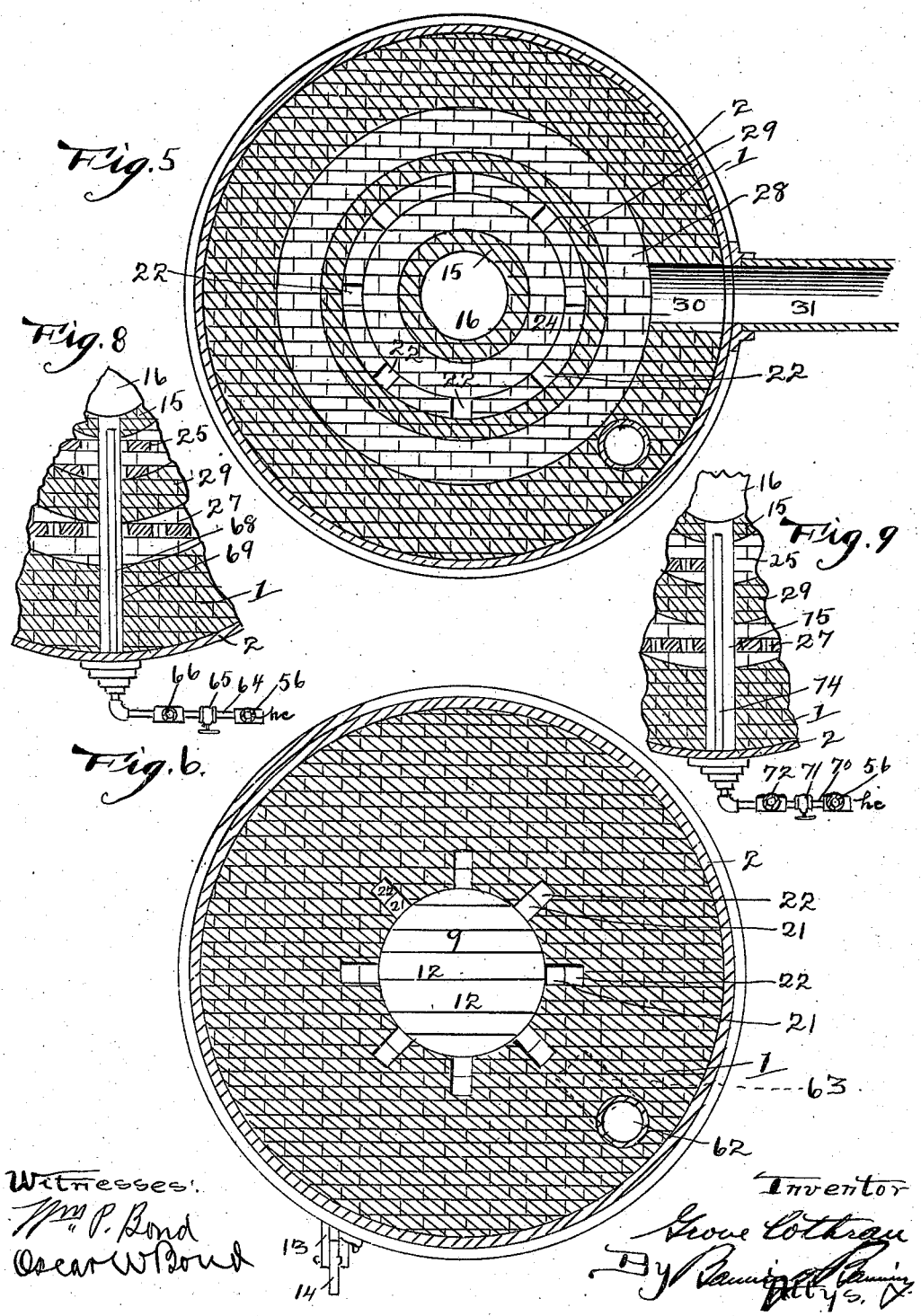

UNITED STATES PATENT OFFICE.

GROVE COTHRAN, OF CHICAGO, ILLINOIS, ASSIGNOR TO CHICAGO TITLE AND TRUST COMPANY, TRUSTEE, A CORPORATION OF ILLINOIS.

PROCESS OF GENERATING GAS.

No. 847,733.     Specification of Letters Patent.     Patented March 19, 1907.

Application filed July 6, 1905. Serial No. 268,312.

*To all whom it may concern:*

Be it known that I, GROVE COTHRAN, a citizen of the United States, residing at Chicago, in the county of Cook and State of Illinois, have invented a certain new and useful Improvement in Processes of Generating Gas, of which the following is a specification.

This invention relates particularly to process for generating carbureted water-gas for heating and illuminating purposes, and has for its objects to furnish a process by the use of which a much longer period of time for generating the gas can be obtained under one firing of the furnace or generator and by which the volume of gas produced from the disintegrated steam and the liquid hydrocarbon and a charge of incandescent material can be largely increased; to commingle superheated steam with a liquid hydrocarbon, thereby cutting the liquid hydrocarbon, and then project the commingled steam and liquid hydrocarbon into incandescent material for vaporization purposes; to inject steam mixed with a small quantity of air to pass up through the incandescent material to become thoroughly disintegrated into its component elements and at the same time have the steam and air maintain an incandescent heat for the furnace during a longer period of time than it is possible to attain in generating gas as heretofore practiced; to employ a blast of air for bringing the generator or furnace to an incandescent heat and when the incandescent-point is reached close the air-blast and admit steam mixed or commingled with a small quantity of air for the steam and air to pass up through the incandescent material or fuel into the generating-chamber for the steam to be disintegrated and become combined with vaporized oil or other liquid hydrocarbon within the confines of the incandescent material; to inject liquid hydrocarbon cut by superheated steam into an incandescent body of fuel and pass the vapor for the permanent gas thus produced from the incandescent body of fuel under conditions by which at horough gasification will take place before the gas is delivered from the final fixing-chamber; to furnish a travel for the produced vapor from the point of subjection to the incandescent heat to the point of exit from the final fixing-chamber, by which all the non-gaseous vaporous portions will be removed under the effects of greater heat for an increased period of time; to produce a permanent and fixed gas free from deleterious vaporous matters before the delivery into the water seal, thereby making a gas of greater permanency and at the same time reducing the quantity of by-products or residuum by a more thorough gasification of oils or other liquid hydrocarbons; to pass the vaporized oil or liquid hydrocarbon from the initial vaporizing or fixing chamber through the upper portion of the incandescent material or fuel in the fire-chamber in direct contact with the incandescent material or fuel and cause the more volatile portions to pass to the final fixing-chamber, where all vaporous products will be removed, leaving only the permanent gas; to burn more or less of the tarry and non-gaseous products and residuum of the oils or liquid hydrocarbons in the fire or fuel chamber, thereby producing heat which assists in maintaining the heat in the generator for vaporizing the oils or liquid hydrocarbons before passing into the final fixing-chamber, thus enabling the generator to be operated with a less quantity of fuel than ordinarily required for the purpose, and to increase and maintain the heat within the fire or fuel chamber by the addition of the tarry and heavy consumable products and residuum of the oils or liquid hydrocarbons, which are consumed by direct contact with the incandescent material, thereby preventing the escape of the heavy and other non-gaseous by-products or residuum, except the vapor for the permanent gas into the final fixing-chamber for delivery of a permanent gas only from the generator.

The invention consists in the several steps and method of treatment and the series of acts to be performed as hereinafter described, and pointed out in the claims.

The first step or act of the series of steps or acts constituting the process of the present invention is to bring the generator or furnace as a whole, together with the fuel or incandescent material in the fire-box or fuel-chamber of the furnace, to an incandescent heat by means of a blast of air forced into the ash-pit of the generator or furnace and carried through the incandescent material or fuel and through the generating or initial fixing chamber and the final fixing-chamber to the point of delivery of the fixed permanent gas and continuing this blast of air until the generator or furnace and the incandescent material or fuel are brought to the condition of a white heat.

The next step or act in the series of steps or acts of the process of the invention is to admit a small percentage of air into the draft for the generator or furnace to pass through the incandescent material or fuel in the fire-box or fuel-chamber and at the same time to admit steam into a superheating-coil located within the generator or furnace and having connection with the draft or blast-pipe for commingling the superheated steam with the small amount of admitted air for the commingled steam and air to pass through the incandescent material or fuel in the fire-box or fuel-chamber and have the steam disintegrated into its component elements and have the air act to assist combustion and maintain the heat of the generator or furnace for a lengthened or increased period of time than could be attained if steam alone, without the air, were passed through the incandescent material or fuel.

Another step or act in the series of steps or acts employed in carrying out the process of the invention is to deliver to the generating or initial fixing-chamber oil or liquid hydrocarbon, commingled with and cut by superheated steam, for the force of the projection and the heat of the wall of the generating or initial fixing-chamber to vaporize the oil or liquid hydrocarbon.

Another step or act in the series of steps or acts entering into the process as a whole of the present invention is to draw the produced vapor from the generating or initial fixing-chamber into the upper part of the incandescent material or fuel to be thoroughly combined with the disintegrated steam and have the combination of hydrocarbon vapor and disintegrated steam pass out from the incandescent material or fuel into a final fixing-chamber for the removal of the non-gaseous portions of the vapor, leaving only a fixed permanent gas for delivery.

Another step or act in the series of steps or acts constituting the process as a whole of the present invention is increasing and maintaining the heat of the furnace and the incandescent material or fuel by consuming the inflammable products or residuum of the oil or liquid hydrocarbon carried into the incandescent material or fuel with the descent of the gaseous vapor thereinto.

These several steps or acts when carried out as hereinafter more fully described in connection with the apparatus shown and described or other suitable apparatus for the purpose result in the production of a fixed permanent gas for delivery to a water seal or otherwise and for such other treatment as may be necessary in making a water-gas for heating and illuminating purposes.

Air under pressure for creating the blast by which the incandescent material or fuel in the fire-pot or fuel-chamber and the generating and fixing chamber are brought to the condition of an incandescent or white heat can be supplied under a pressure of three pounds, more or less, for fixing the incandescent material or fuel and the generator or furnace as a whole to the incandescent or white stage of heat, and the blast of air is continued for such a length of time as is necessary for the production of the incandescent or white-heat condition of the generator or furnace, including the incandescent material or fuel. The reduced quantity of air admitted to the blast or draft pipe should be in proportion to the requirements for maintaining the incandescent or white-heat state of the furnace or generator and the incandescent material or fuel without impairing or destroying the condition of the superheated steam projected into the incandescent material or fuel as regards the disintegration of the steam into its component elements for mixing or combining with the vapor of the oil or liquid hydrocarbon, and the proper amount of air can be determined by test, and when ascertained the controlling-valve therefor can be regulated accordingly. The oil or liquid hydrocarbon commingled with and cut by the steam can be projected into the upper end of the generating or initial fixing-chamber for the action of the force of the projection and the heat to break up and vaporize the oil or liquid hydrocarbon. The gaseous vapor, together with the heavier inflammable products or residuum of the oil or liquid hydrocarbon, pass into the upper portion of the incandescent material or fuel, meeting the upward stream of disintegrated steam for the gaseous vapor and the disintegrated steam to combine and commingle and form the base of the water-gas, while the inflammable heavier products or residuum are consumed and the heat thereof added to the heat of the incandescent material or fuel, giving a higher degree of heat for the more effective and thorough vaporizing and disintegrating step or act in making the fixed permanent gas. The gaseous vapor from the oil or liquid hydrocarbon, combined with the disintegrated steam, passes from within the incandescent material or fuel under a high degree of heat to the point of discharge from the final fixing-chamber and is subjected to a high degree of heat from the point of admission into the final fixing-chamber to the point of discharge therefrom and also has a retarded and wavy passage through the final fixing-chamber by which the non-gaseous part of the vapor will be removed, leaving only the fixed permanent gas for delivery from the final fixing-chamber. The several steps or acts of the process as a whole by their combined effect result in the production of a water-gas having a fixed permanent body when delivered from the generator to the water seal, and the combining of the gaseous vapor of the oil or liquid hydrocarbon and the distegrated steam within the incandescent material or fuel at the upper portion of the fire-pot or fuel-chamber under the effects of the heat, intensified by the added consumable products or residuum of the oil or liquid hydrocarbon, gives an increase in the amount of gaseous vapor produced and also lengthens the period of time during which the generator can be operated after being brought to an incandescent or white-heat state before having the heat reduced to a degree where the generator becomes inoperative. The process of the present invention therefore adds materially to the amount of gas generated and the time during which the vaporization of the oil or liquid hydrocarbon can be continued, both of which advantages are of value and merit, as they enable an increase in the output of gas to be obtained from a single charge of incandescent material or fuel, and this by using a less quantity of incandescent material or fuel.

An apparatus suitable for the purpose of carrying out the process of the invention is shown in the accompanying drawings, in which—

Figure 7:
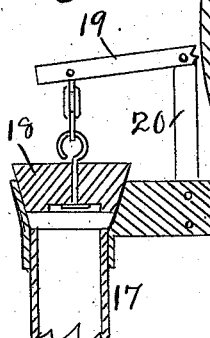
Figure 4:
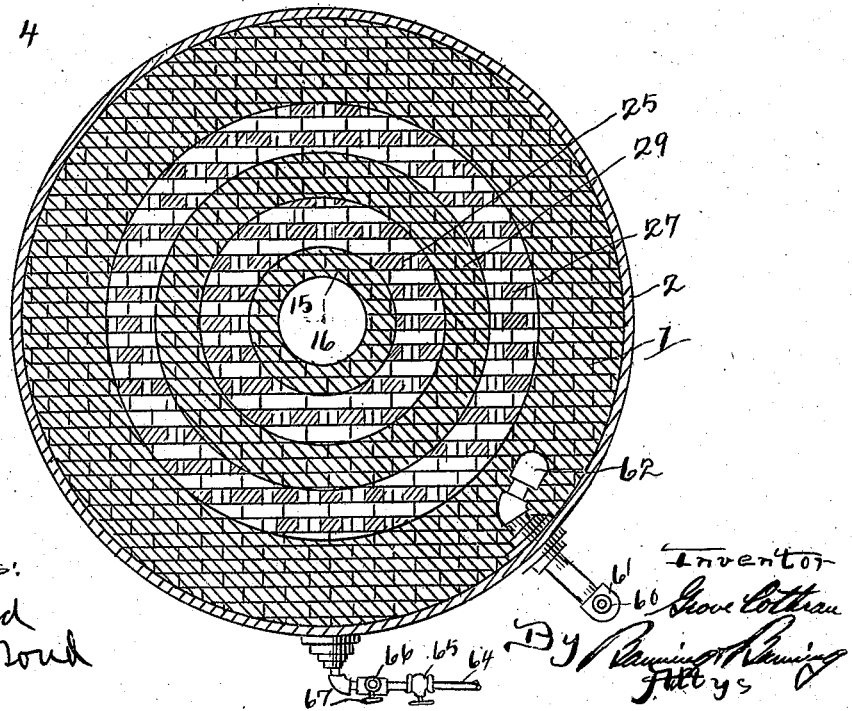

Figure 1 is a front elevation of a generator connected with a water seal; Fig. 2, a sectional elevation of the generator; Fig. 3, a cross-section on line 3 of Fig. 1; Fig. 4, a cross-section on line 4 of Fig. 1; Fig. 5, a cross-section on line 5 of Fig. 1; Fig. 6, a cross-section on line 6 of Fig. 1; Fig. 7, a detail, partly in section, of the feed-tube and its cap; Fig. 8, a detail, partly in section, showing the injecting-pipe for light hydro-carbons; and Fig. 9, a detail, partly in sections, showing the injecting-pipe for heavy hydrocarbons.

The apparatus has a furnace formed of a wall 1, of fire-brick, incased in a shell or cylinder 2, preferably of steel, and having a cap or cover 3, between which and the top of the brickwork is a chamber 4, containing a filling 5, of asbestos and sand, to prevent the radiation of heat at the top of the furnace or generator. At the bottom of the furnace or generator is an ash-pit 6, with an outlet 7, closed by a door 8 for access to the ash-pit. The central portion of the furnace or generator has a fire-pot or fuel-chamber 9 of a truncated-cone formation, with the apex at the top thereof and having at the base an outlet 10, closed by a door 11, for access to the fire-pot or fuel-chamber. A grate 12, preferably of the type having rocking bars, is located between the fire-pot or fuel-chamber and the ash-pit, which grate is actuated, by means of a bar 13 and a lever 14 from the exterior of the furnace or generator, to dump the ashes from the residue of incandescent material or fuel into the ash-pit. An annular wall 15 extends from the top or apex end of the fire-pot or fuel-chamber to the cap or top plate 3 and surrounds a chamber or passage 16, into which the oil or liquid hydrocarbon is injected to be initially vaporized. A tube of metal 17 extends upwardly from the annular wall 15, and its upper end is closed by a plug or cap 18, which can be raised and lowered by a lever 19, supported from a standard or upright 20, attached to or formed with the upper end of the tube, and through the tube 17 and the passage or chamber 16 the incandescent material or fuel can be deposited in the fire-pot or fuel-chamber when the plug or closure 18 is raised, and after the incandescent material or fuel for the charge is deposited in the fire-pot or fuel-chamber the plug or closure 18 is dropped, tightly closing the fire-pot or fuel-chamber.

A series of openings 21 is formed in the wall surrounding the fire-pot or fuel-chamber, and these openings are located some distance below the top or apex end of the fire-pot or fuel-chamber, and each opening 21 communicates with a passage 22, formed in the wall or brickwork of the furnace or generator, each passage leading upward and communicating, by means of a lateral opening or passage 23, with an annular chamber or passage 24, which is partly filled with checker-work 25, terminating below the top of the wall or brickwork of the furnace or generator in an annular chamber 26, above a checker-work 27 in an annular chamber or passage 28, separated from the chamber or passage 24 by an annular wall 29, so that a passage-way or line of travel is formed from below the top of the fire-pot or fuel-chamber into the passage or chamber 24 up through the checker-work 25 into the chamber 26 and down through the checker-work 27 into the annular passage or chamber 28, giving the produced gaseous vapor a continuous retarded travel, subject to the action of the heat of the generator and the checker-work, by which a fixed permanent gas will be formed for delivery from the generator.

A passage or outlet 30 is formed in the wall or brickwork on one side and is in communication with the annular chamber or passage 28 for educting or discharging the fixed permanent gas, and connected with this outlet or passage 30 is a pipe 31, leading from which is a pipe 32, controlled by a valve 33 and furnishing a direct draft for firing or blowing up the furnace or generator and the incandescent material or fuel to a white heat. The pipe 31 is connected by a pipe or coupling 34 with a water seal 35, into the top of which a pipe 36 leads for supplying water to the water seal, and leading from the top of the water seal is a pipe 37 for conveying the gas to other appliances for treatment in making a heating or illuminating gas. A trap 38 is connected with the water seal and serves to maintain the proper height of water in the seal, and this trap is controlled by a valve 39, so as to escape the water properly for maintaining the level in the water seal.

A supply-pipe 40 for air under pressure leads from a suitable air-compressor or fan or other source of air-supply, and this pipe is connected with a pipe 41, leading from which is a pipe 42, controlled by a valve 43, by means of which the amount of air passing through the pipe 42 can be regulated and controlled. A pipe 44 is connected with the main air-pipe 41 and has a valve 45, by means of which the passage through the pipe 44 can be opened or closed or partly opened or closed, as may be required, to furnish a relief for discharging a proportionate amount of air, so that the full pressure or quantity of air is not supplied to the blast-pipe 42 for admission to the furnace or generator. A steam-pipe 46, having a controlling-valve 47 and a controlling-valve 48, is entered into a reducer in the end of the main air-supply pipe 41, and adjacent to the point of admission of the steam-supply pipe into the air-pipe is a controlling-valve 49, by means of which communication can be wholly opened or closed or partially closed, as may be required, between the air-pipe and the steam-pipe. A pipe 50, having a controlling-valve 51, connects the steam-supply pipe 46 with the blast-pipe 42 above the controlling-valve 43 of said valve, so that by closing the valve 43 and opening the valve 49 air can be supplied to the blast-pipe 42 above the controlling-valve 43 of said pipe. A lead-pipe 52 is connected at its lower end with the steam-supply pipe 46 and extends upward and is connected at its upper end with a coil 53, located in the chamber 4 and surrounded by the filling 5 in said chamber, and the other end of this coil 53 is connected to a pipe 54, having a controlling-valve 55 and coupled to a downpipe 56, the lower end of which is connected with the main supply-pipe 46 with a controlling-valve 57, by means of which communication between the down lead-pipe 56 and the main steam-supply pipe can be controlled. A lateral pipe 58, having a controlling-valve 59, leads from the pipe 54 and is connected with a reducer 60 in a coupling 61 at the upper end of the blast-pipe 42, so that superheated steam can be injected into the coupling to commingle with air under pressure in the blast-pipe. A downdraft or blast pipe 62 is located in the wall or brickwork of the generator and at its upper end is connected with the coupling 61, and its lower end is connected with a discharge-pipe 63, projecting into the ash-pit 6 below the grate, so that a blast of air or blast of combined superheated steam and air can be injected into the ash-pit to pass up through the grate and the incandescent material or fuel in the fire-pot or fuel-chamber for the steam to be disintegrated by the heat of the incandescent material or fuel and separated into its component elements for mixing or combining with the hydrocarbon vapor to form the gas. The amount of air admitted into the blast-pipe 42 and combined with the superheated steam to pass down through the blast-pipe 62 is regulated by opening the valve 45 of the relief-pipe 44, so as to escape the proper amount of air, allowing only a small amount of air to enter the blast-pipe 42 through the pipe 50, the supply being controlled by the valve 49, and when air is applied through the pipe 50 the valve 48 and the valve 57 are closed and the valve 51 is opened or partially opened.

A lateral pipe 64, having a controlling-valve 65, leads from the downtake-pipe 56 for the superheated steam, and connected with the pipe 64 is a pipe 66, having a controlling-valve 67 and leading from a source of oil or other liquid hydrocarbon for supplying the oil or liquid hydrocarbon to the pipe 64 to be cut by and commingled with superheated steam projected into the pipe 64 from the downtake-pipe 56, and the delivery end of the pipe 64 is in communication with a pipe 68, located in a passage or conduit 69, formed in the wall or brickwork of the furnace or generator with the pipe 68 terminating short of the mouth or opening of the passage or conduit 69 into the vaporizing or initial fixing chamber 16, in which chamber the oil or other liquid hydrocarbon is vaporized by the action of the heat and the contact with the incandescent wall surrounding the chamber. The pipe 64 in the arrangement shown is for delivering light oil or liquid hydrocarbon to the vaporizer or initial fixing-chamber, and, as shown, leading from the downtake-pipe 56, below the pipe 64, is a lateral pipe 70, controlled by a valve 71, with which pipe a pipe 72, controlled by a valve 73, is connected, and the pipe 72 leads from a source of supply for liquid tar or other heavy liquid hydrocarbon. The delivery end of the pipe 70 connects with a pipe 74, located in a passage-way or conduit 75, formed in the wall or brickwork of the generator or furnace, and the pipe 74 terminates short of the mouth or opening of the passage-way or conduit 75 into the vaporizing or initial fixing chamber 16 and through the pipe 74 the tar or other heavy liquid hydrocarbon, cut and commingled with superheated steam in the pipe 70, is projected into the vaporizing or initial fixing chamber for the heat and contact with the wall of the chamber to vaporize the tar or other heavy liquid hydrocarbon. It will be understood that when a light oil or liquid hydrocarbon is to be operated upon the valve 73 is closed, and that when liquid tar or heavy liquid hydrocarbon is being operated upon the valve 67 is closed, and that when the oil or light liquid hydrocarbon is being controlled the valve 65 is opened and the valve 71 closed, and when liquid tar or other heavy liquid hydrocarbon is being treated the valve 71 is opened and the valve 65 closed.

A sight-opening 76 is provided through the wall of the furnace for inspection of the grate and ash-pit, a sight-opening 77 is provided in the wall of the furnace or generator for inspection of the fire-pot or fuel-chamber, a sight-opening 78 is provided in the wall of the generator or furnace for inspection of the vaporizer or initial fixing chamber, a sight-opening 79 is provided in the wall of the furnace or generator for inspection of the outer chamber or passage of the final fixing chamber, and an opening 80, closed by a cap or plug, is provided for admitting air into the ash-pit below the grate to maintain combustion when the furnace is not in use.

The operation in carrying out the several steps or acts of the process is as follows: The charge of incandescent material or fuel, such as coke or coal, is deposited in the fire-pot or fuel-chamber 9 by opening the plug or closure 18 and delivering the incandescent material or fuel through the tube 17 and chamber or passage 16, and after the proper amount of incandescent material or fuel is charged into the fire-pot or fuel-chamber the plug or closure 18 is dropped into position to close the tube 17, tightly closing the fire-pot or fuel-chamber. The incandescent material or fuel is ignited and air under a pressure of three pounds, more or less, is admitted from the main air-pipe 41 into the blast-pipe 42 by opening the valve 43 for the admitted air to pass into the down section 62 of the blast-pipe and be projected through the discharge-pipe 63 into the ash-pit below the grate for the air to pass up through the incandescent material or fuel in the fire-pot or fuel-chamber and through the openings 21, passages 22, openings 23, passages 24 and 28, and checker-work 25 and 27, and out at the discharge-opening 30, and through the draft-pipe 32, the valve 33 of which is opened for the purpose, creating a blast of air, carrying with it the heat units, by which the incandescent material or fuel and the wall of the vaporizing and fixing chambers will be brought to an incandescent or white heat. During the operation of blowing up or heating the furnace or generator to an incandescent state or condition the steam and supply of liquid hydrocarbon is shut off and so remains until the generator or furnace is in operative condition as to heat. The valve 43 is now closed and the valve 45 open to a sufficient extent to escape the greater portion of the air, and the valves 49 and 51 are opened for air under a slight pressure to flow through the pipe 50 into the draft pipes or tubes 42 and 62 into the ash-pit. The valve 48 in the main steam-pipe remains closed, and the valve 57 in the superheated-steam pipe 56 is also closed. The valve 47 in the main steam-supply pipe is opened, allowing steam to pass up through the pipe 52 into the coil 53, where it becomes superheated, and in order to superheat the steam in the coil the supply-pipe 52 is of a less capacity than the coil, and the discharge-pipe 54 is also of less capacity, so that the steam will expand in the coil and be held therein against discharge, thereby insuring the superheating of the steam. The valve 55 in the discharge-pipe 54 is opened, allowing steam to enter the downtake-pipe 56 for supplying steam to the draft-pipe 42 and 62 and to the supply or delivery pipe for the liquid hydrocarbon to the vaporizing or initial fixing chamber 16 of the generator, for which purpose the valve 59 in the pipe 58 is opened for steam to enter the coupling 61 and commingle with the small quantity of air passing through the draft-pipe for the mixture of superheated air to enter the ash-pit and pass up through the incandescent material or fuel, where the steam is disintegrated into its component or constituent elements and the air is added to the incandescent material or fuel for maintaining the heat thereof and of the furnace or generator. The valve 65 in the lateral pipe 64 is opened, and the valve 67 in the oil or liquid-hydrocarbon pipe 66 is also opened for oil and steam to commingle in the pipe 64 and have the steam cut the oil or liquid hydrocarbon which is delivered through the pipe 68 into the vaporizing or initial fixing chamber 16, where it is vaporized by contact with the wall surrounding the chamber and the heat of the wall and the chamber. The vapor thus generated, together with the heavier products or residuum of the oil or liquid hydrocarbon, descends into the top of the fire-pot or fuel-chamber and enters the upper portion of the incandescent material or fuel, where the vapor combines with the disintegrated steam, and the gas thus formed passes out through the openings 21 and up through the passages 22, entering the chamber or passage 24 through the openings 23 and passing up through the interstices of the checker-work into the chamber 26 and down through the interstices of the checker-work 27 into the chamber or passage 28 for discharge at the opening or outlet 30 to flow into the water seal 25, the valve 33 in the draft-pipe 32 being closed as soon as the main blast of air is shut off from the ash-pit. The gas passing up through the checker-work 25 and down through the checker-work 27 is subjected to the heat of the checker-work and the furnace or generator, by which the non-gaseous portions thereof will be destroyed or removed, leaving only a fixed permanent gas for delivery through the outlet or opening 30 into the water seal.

The vaporizing operation is continued until the incandescent material or fuel and the furnace or generator has become too cool to further vaporize and produce gas, and when this condition is reached the supply of steam and oil or liquid hydrocarbon is shut off, and the valves for admitting air through the pipe 50 are closed, and the valve in the draft or blast pipe 42 is opened, and the valve 33 in the outlet blast-pipe 32 is also opened, again admitting air to the ash-pit to pass up through the fuel and bring the fuel and the furnace or generator to a white heat, and when this end is accomplished the blast of air is shut off and the small quantity of air admitted to the blast-pipe through the pipe 50 and the steam and oil or liquid-hydrocarbon supply is again opened, vaporizing the oil or liquid hydrocarbon and delivering a fixed permanent gas, as already described. The blowing up of the furnace or generator and the admission of steam and oil or liquid-hydrocarbon supply can be continued until the incandescent material or fuel in the fire-pot or fuel-chamber is burned out, when the fire-pot or fuel-chamber can be recharged with a new supply of fuel, and the operation hereinbefore described can then be proceeded with to produce a fixed permanent gas for delivery to the water seal. The supply-pipe 72 for liquid tar or other heavy liquid hydrocarbons is closed, as is also the pipe 70, when the pipe 64 is open to superheat steam and the pipe 66 is open to supply oil or liquid hydrocarbon, and for vaporizing liquid tar or other heavy liquid hydrocarbon the pipes 64 and 66 are closed and the pipes 70 and 72 are opened for admitting superheated steam and liquid tar or other heavy liquid hydrocarbon into the pipe 74 for the steam to cut the tar or heavy liquid hydrocarbon, which is projected into the vaporizer or initail fixing-chamber 16, where it is vaporized and the vapor produced is carried down into the incandescent material and combined with the disintegrated steam for the gas obtained by the combination to pass through the final fixing-chamber, as described hereinbefore, and be delivered as a fixed permanent gas to the water seal.

The bringing of the produced vapor and the by-products or residuum of the oil or liquid hydrocarbon into the upper portion of the fire-pot or fuel-chamber adds the heat-producing consumable by-products or residuum to the incandescent material for combustion, by which the heat of the furnace or generator is maintained to a high degree and for a longer period of time than would be the case if the by-products or residuum were not added to the incandescent material or fuel, and in addition the heat acting on the by-products or residuum will result in completely vaporizing the oil or liquid hydrocarbon, so that the full amount of vapor that it is possible to produce will be obtained, adding materially to the volume of fixed permanent gas produced. It will thus be seen that with the process of the present invention less incandescent material or fuel is required, the heat of the furnace or generator is maintained for a longer period of time, and an increased amount of fixed permanent gas is obtained, and these advantages pertaining to the process of the present invention are valuable and meritorious and are new features in the art of generating gas.

The two important and essential steps or acts entering into the process of the present invention are passing a blast of steam commingled with a small proportion or amount of air into the incandescent material or fuel for the steam to be disintegrated and for the air to maintain combustion and heat during an increased period of time and bringing together the gaseous vapor and the disintegrated steam within the upper portion of the incandescent material or fuel, thereby increasing the heat and maintaining the operative condition of the furnace or generator for a longer period of time, assisting greatly in renewing the incandescent condition of the furnace or generator, including the incandescent material or fuel, and increasing the volume of gas created or produced with a single charge of incandescent material or fuel during a given period of time.

What I claim as new, and desire to secure by Letters Patent, is—

1. The process herein described of generating gas, which consists in initially vaporizing commingled liquid-hydrocarbon and superheated steam, downwardly drawing the produced vapor with the heavier residuum of the hydrocarbon into a mass of incandescent fuel, upwardly drawing into the same mass of incandescent fuel superheated steam and air for disintegrating the steam, combining within the upper portion of the mass of incandescent fuel the vapor of the hydrocarbon and the disintegrated steam, and passing the gaseous vapor thus formed laterally from within the mass of incandescent fuel and finally fixing and transforming the gaseous vapor into a permanent gas, substantially as described.

2. The process herein described of generating gas, which consists in drawing downwardly into a mass of incandescent fuel the vapor and residuum of a liquid hydrocarbon, drawing upwardly into the same mass of incandescent fuel superheated steam and air for disintegrating the steam, combining within the mass of incandescent fuel the vapor of the hydrocarbon and the disintegrated steam, withdrawing the gaseous vapor thus formed laterally from within the mass of incandescent fuel, and finally fixing the gaseous vapor thus formed and transforming the same into a permanent gas, substantially as described.

GROVE COTHRAN.

Witnesses:
 OSCAR W. BOND,
 WALKER BANNING.